United States Patent [19]

Vecchiotti

[11] 3,900,640

[45] Aug. 19, 1975

[54] HOLLOW, MULTI-LAYERED, CROSS-LINKED PLASTIC STRUCTURES AND PROCESS FOR PRODUCING SAME

[75] Inventor: Camillo M. Vecchiotti, Ridgewood, N.J.

[73] Assignee: Amerace Corporation, New York, N.Y.

[22] Filed: Oct. 29, 1973

[21] Appl. No.: 410,815

[52] U.S. Cl. .............. 428/36; 136/181; 138/137; 138/146; 206/2; 220/DIG. 14; 264/310; 428/188; 428/420; 428/482; 428/500
[51] Int. Cl.² .............. B65D 85/84; B65D11/20; B32B 27/36; B32B 27/32
[58] Field of Search .............. 220/83, 64, DIG. 14; 206/2; 161/188, 139, 231, 233, 247; 138/137, 146, DIG. 7

[56] References Cited
UNITED STATES PATENTS

| 3,109,763 | 11/1963 | Finger | 161/231 X |
|---|---|---|---|
| 3,388,007 | 6/1968 | Fiandt | 206/2 X |
| 3,391,823 | 7/1968 | Tijms | 161/160 X |
| 3,408,234 | 10/1968 | Ririe | 136/181 |
| 3,471,359 | 10/1969 | Goldstein | 161/231 X |
| 3,491,799 | 1/1970 | Foll | 138/137 |
| 3,528,542 | 9/1970 | Miller | 206/2 |
| 3,556,816 | 1/1971 | Nughes | 161/231 X |
| 3,561,493 | 2/1971 | Maillard | 161/188 X |

Primary Examiner—Harold Ansher
Attorney, Agent, or Firm—S. Michael Bender; R. A. Craig; Gregory J. Battersby

[57] ABSTRACT

Hollow, multi-layered plastic structures are provided comprising a layer of thermoplastic polyester material and a layer of polyethylene, the polyethylene and polyester layers being cross-linked together at their interface. A process for producing such structures which comprises charging a mold with thermoplastic polyester material, rotating and heating the mold so as to fuse and form a layer of the polyester material on the inner surface of the mold, cooling the mold to a point below the melting point of the polyester but above the melting point of a subsequently added cross-linkable polyethylene material, stopping the rotation and charging the mold with the cross-linkable polyethylene material, resuming the rotation of the mold and heating it to a temperature sufficient to fuse and cross-link the polyethylene with the polyester layer, cooling the mold to a point below the melting point of the polyethylene and removing the finished structure from the mold.

5 Claims, No Drawings

HOLLOW, MULTI-LAYERED, CROSS-LINKED PLASTIC STRUCTURES AND PROCESS FOR PRODUCING SAME

BACKGROUND OF THE INVENTION

This invention is directed to hollow, rotationally molded, multi-layered plastic structures and to a method for forming such structures. More particularly, this invention relates to rotationally molded, hollow structures formed from at least two plastic materials having varying physical and chemical properties, one of which is preferably cross-linkable.

The use of plastic in forming relatively large containers which are useful for industrial applications, such as for example, containers for large storage batteries, is known in the art. However, because the use of certain plastics in forming such containers is economically impractical, and because of the poor physical or chemical properties inherent in less expensive plastics, the use of such materials in forming industrial scale structures has not been universally accepted. For example, cases used in manufacturing storage batteries which are installed in telephone exchanges are currently manufactured from thermoset compositions rather than thermoplastic materials. While such a composition is said to have the desired chemical and load resistant properties required for that particular use, cases formed from such hard rubber are quite heavy, are not flame resistant and have poor impact resistance.

Previous attempts to solve the apparent dilemma of balancing cost with required chemical and/or physical properties have included the formation of a multi-layer laminate of plastic materials, which are mechanically or adhesively bonded to each other, one layer having the desired structural strength properties and the other having resistivity to attack by chemicals. An example of such a multi-layered structure may be found in U.S. Pat. No. 3,391,823 to Tijms, which employs a layer of foamed polyethylene between a polyethylene layer and a polyester layer to effect a mechanical bond therebetween. Another example of such a structure is seen in U.S. Pat. No. 3,652,368, to Formo, which discloses a method and a special apparatus for rotationally molding plastic materials in a manner which allows for a blending of the materials at their interface thus forming a mechanically cohesive bond therebetween. Other means of bonding dissimilar plastic materials together have required surface treatments of each plastic layer by methods including flame, electrical discharge, chlorination, or chemical oxidation.

SUMMARY OF INVENTION

It has now been discovered that hollow, multi-layered plastic structures can be produced in which the respective layers are bound together at their interface by cross-linking of the polymeric molecules. According to this invention, one of the layers is a thermoplastic polyester, preferably a high melting polyester, while the other is formed from cross-linkable polyethylene. The process utilized in forming such structures comprises charging a mold with a sufficient amount of polyester material to form a continuous coating of predetermined thickness on the inner surface of the mold, heating the mold to a temperature above the melting point of said polyester, rotating the heated mold for a sufficient period of time to fuse said polyester and form a layer on the inner surface of the mold, cooling the rotating mold to a temperature below the melting point of said polyester but above the melting point of crosslinkable polyethylene so as to crystallize said polyester layer, charging the slightly cooled but heated mold with a sufficient amount of cross-linkable polyethylene to form a continuous coating on said polyester layer, rotating said heated mold for a sufficient period of time to form a polyethylene layer of predetermined thickness on said polyester layer and to effect cross-linking across said layers at their interface, cooling said rotating mold to a point below the melting point of said polyethylene layer so as to solidify the layers, and removing a hollow, multi-layered structure from the mold.

Accordingly, it is an object of this invention to produce a hollow, multi-layered plastic structure in which the respective layers are cross-linked together at their interface.

It is a further object of this invention to provide a hollow plastic structure having an outer thermoplastic polyester layer and an inner, cross-linked thermoplastic polyethylene layer.

It is still further an object of this invention to provide a process for producing hollow, multi-layered plastic structures which are characterized by an outer layer having superior physical properties and an inner layer having resistivity to chemical degradation said layers being cross-linked together at their interface.

These and other objects and advantages of the present invention will become more apparent in the ensuing description and appended claims.

DETAILED DESCRIPTION OF THE PREFERRED EMBODIMENT

The hollow, multi-layered structure according to this invention comprises an outer polyester layer and an inner polyethylene layer, both layers being cross-linked together at their interface.

The polyester material utilized in forming these structures may be selected from any of the commercially available thermoplastic polyesters including linear polyester resins such as a linear, highly polymerized ester of terephthalic acid and a glycol of the series $HO(CH_2)_n OH$ wherein $n$ is a whole number within the range of 2 to 10. An important feature of the selected polyester is its melting point which must be higher than that of the cross-linkable polyethylene utilized in this invention. In a preferred embodiment the polyester material will have a melting point between about 400° and about 500°F. Filler, including fibrous materials such as glass, quartz, cotton, asbestos, ramie, and sisal, may be added to the polyester to improve its strength and other properties. In a preferred embodiment, the polyester will be a thermoplastic, glass-fiber filled, polyester based condensate polymer marketed by the Celanese Plastic Company under its mark "Celanex". Although the particle size of the polyester is not critical to the invention, in general, the polyester material should be finely divided powder and preferably, should have a particle size ranging from about 30 to 40 mesh when passed through a standard sieve.

The polyethylene material used in forming the second layer of the above-indicated multi-layered structure must be cross-linkable with the polyester of the first layer and accordingly, it must contain a cross-linking agent; for example, a peroxide such as dicumyl peroxide, 2,5-dimethyl 2,5-di (t-butyl peroxy) hexane, or 2,5-dimethyl -2,5-di (t-butyl peroxy) hexyne -3. In a preferred embodiment, the polyethylene will also contain a fire retardant agent such as, for example, any of the well known halogenated retardants. The cross-linkable polyethylene should be finely divided, for example a 50 mesh powder and, preferably, have a melting point within the range 250°–300°F. A particularly preferred fire retardant, cross-linkable polyethylene is marketed by U. S. I. Chemicals, a Division of National Distillers and Chemical Corporation, under the mark "Flamolin".

The production of the above described structure according to this invention is accomplished in a rotational molding apparatus which is biaxially rotated. Any conventional rotational casting equipment may be used for such purposes, such as, for example, any of the equipment described in the article by L. A. McKenna, "Rotational Molding", Modern Plastics Encyclopedia, pages 780 et seq. (1967). Although the shape of the mold forms no part of the present invention, it will be appreciated that should it be desirable to produce molded shapes such as a battery container, for example, the mold will generally have a corresponding hollow rectangular shape. Preferably, and in order to facilitate loading of the mold and withdrawal of the molded article therefrom it is provided at one end thereof with a detachable cover including a generally smaller filling opening therein. Disposed in the filler opening in the mold cover is a removable plug or similar such closure means. The rate of rotation of the mold is not critical to the invention, but it should generally be of a sufficient rate to provide a uniform distribution of the fused thermoplastic material on the inner surface of the mold. Speeds of 12 rpm on the major axis and 15 rpm on the minor axis with a 4:1 ratio of major to minor axis rotation have been found to be particularly effective in achieving such a uniform distribution.

The process for producing the structures of this invention is carried out by first removing the cover with its filling plug and charging the mold with the desired amount of thermoplastic polyester. In the usual case, the mold will be sprayed with a mold release agent prior to its charging with the polyester which, in a preferred embodiment, will be pre-dried in a hot air circulating oven. After the mold is filled, the cover and its plug are replaced and the mold is passed into the heating stage, usually an oven heated to a temperature between about 550°F to about 650°F, preferably 600°–625°F, and rotated biaxially in that stage for a sufficient period of time to fuse the polyester and form a uniform coating in the mold. This is usually accomplished in about 20–30 minutes, preferably 25 minutes. At the end of this period the mold is indexed to a cooling chamber where biaxial rotation is maintained and the mold is cooled to a point below the melting point of the polyester but above that of the cross-linkable polyethylene. This cooling may be accomplished with a fan and a cooling cycle of about 7–10 minutes, although, alternatively, other conventional heat exchange mediums may be used. At the end of the cooling cycle the mold temperature will generally be between about 280°–350°F and the polyester layer on the inner surface thereof will be crystallized or set. At the end of this first cooling cycle the rotational molding apparatus will be stopped and with its cover maintained thereon the filler plug is removed to permit the mold to be charged with the desired amount of cross-linkable polyethylene through the plug filling opening. Following the addition of the cross-linkable polyethylene to the mold and replacement of the filling plug in the cover opening, the mold is indexed into an oven station set at a temperature between about 425°–450°F where it is rotated biaxially for a period between about 20–25 minutes. The speeds and ratio of rotation of the mold during this period will be the same as those used in the first heating stage. As the cross-linkable polyethylene comes in contact with the crystallized or set surface of the polyester it will fuse and become uniformly distributed over the surface of the polyester layer by the centrifugal force of the rotating cycle. By maintaining the mold in the oven station at the above indicated temperature for the previously suggested period of time, cross-linking between the polyester layer and the polyethylene layer will take place at their interface. It will be noted that due to the temperature range maintained during this second oven stage there is no melting and consequently, no dimensional distortion of the polyester layer on the inner surface of the mold. At the end of this oven cycle the mold will then be indexed to a cooling chamber where it is cooled to a temperature below the melting point of the polyethylene and to a point which permits handling of the finished structure to remove it from the mold. This may be accomplished, for example, by a cooling cycle which includes the use of a fan for about 8 minutes followed by a water spray for about 10 minutes and the fan again for about 2 minutes. When the mold has been properly cooled it is transferred to an unloading station where the cover is unclamped and removed from the mold to allow ready access to the multi-layered molded structure within. This molded product is removed from the mold and allowed to cool to room temperature in an upright position, usually overnight. In order to finish the resulting product, it may then be cut to its final desired dimension or form, e.g., to produce a battery container the top of the molded article is cut off to produce a container of the proper height.

The following example will further illustrate a specific embodiment of the invention.

EXAMPLE

A hollow, bi-layered, cross-linked plastic battery case was produced according to the following process. An electroformed, nickel mold having an end opening design and a removable Teflon filling plug in the cover for the end opening was mounted on a McNeil hot air rotocast machine No. 1500-88 (three spindle unit which is capable of rotating the mold biaxially. The mold had been cleaned previously and sprayed with a commercially available mold release agent (FRECOTE No. 33). 68 lbs. of CELANEX No. 3310 (glass-fiber filled polyester resin) was charged to the mold through its open end which was then closed and clamped tight. The polyester resin was in finely divided powder form having a particle size ranging from about 30 to about 40 mesh. The charged mold was indexed into an oven set at 620°F where it was allowed to rotate biaxially for 25 minutes at speeds of 12 rpm major axis and 15 rpm minor axis. These speeds produced a 4:1 ratio of major to minor rotation on the machine. The polyester was thus fused and formed a uniform coating on the inner surface of the mold. At the end of this oven cycle the spindle was indexed with the mold to a cooling chamber where the biaxial rotation was maintained and a fan directed on the mold for 7 minutes to set the polyester layer within. The spindle was then indexed with the mold to a load-unload station where rotation was stopped and the Teflon plug removed from the filling opening in the mold end opening cover. Through this filler opening, 15 lbs. of cross-linkable polyethylene (FLAMOLIN MF-15711) in finely divided powder form of about 50 mesh was dumped into the mold and the filling plug replaced in the mold cover. Biaxial rotation was restarted and the spindle was then indexed with the mold to an oven station set at 450°F where it was kept for 25 minutes so that a layer of polyethylene was formed on and cross-linked to the polyester layer. The speeds and ratio of rotation thereof were the same as employed in the first heating station. At the end of the second oven cycle the mold was positioned in a cooling chamber where it was subjected to a fan for 8 minutes followed by a water spray for 10 minutes and then a fan again for 2 minutes; thus lowering the temperature to a point below the melting point of the polyethylene. Following this cooling, the mold was indexed to the unload station where the cover was unclamped from the mold and set aside. The mold was then tilted to a 30° angle whereupon the molded battery case dropped out of the mold with a slight pulling force on the case. After suitable cooling at room temperature, the molded case was cut to desired height. The polyester layer in the finished product had a thickness of approximately one-fourth inch while the polyethylene layer was approximately 0.100 inch thick.

As used in this description of the invention the term "multi" is intended to encompass two layers of layered polymeric material.

The above described process may be used in the production of a wide variety of structures including tanks, containers, vessels, barrels, and the like. Particularly useful multi-layered structures produced according to this invention serve as cases for industrial size batteries. Such a case will have an outer surface with the characteristic structural strength and other properties of polyester but the added feature of resistivity to chemical attack in its inner surface.

I claim:

1. A laminate comprising a first layer of a thermoplastic polyester and a second layer of a cross-linkable polyethylene, the melting point of the polyethylene being lower than the melting point of the polyester, said layers being directly cross-linked at their interface.

2. A laminate as defined in claim 1 wherein said polyester contains a fibrous filler material.

3. A laminate as defined in claim 1 wherein said polyester is a linear, highly polymerized ester of terephthalic acid and a glycol of the series $HO(CH_2)_n OH$ wherein $n$ is a whole number within the range of 2 to 10.

4. A laminate as defined in claim 1 in the form of a battery case comprising a first layer of glass-filled thermoplastic polyester and a second cross-linkable polyethylene layer, said layers being directly cross-linked at their interface.

5. A laminate as defined in claim 1 wherein said polyethylene contains a halogenated flame retardant agent.

* * * * *